(12) United States Patent
Webster

(10) Patent No.: US 10,443,395 B2
(45) Date of Patent: Oct. 15, 2019

(54) COMPONENT FOR A TURBINE ENGINE WITH A FILM HOLE

(71) Applicant: General Electric Company, Schenectady, NY (US)

(72) Inventor: Zachary Daniel Webster, Mason, OH (US)

(73) Assignee: General Electric Company, Schenectady, NY (US)

( * ) Notice: Subject to any disclaimer, the term of this patent is extended or adjusted under 35 U.S.C. 154(b) by 860 days.

(21) Appl. No.: 15/073,687

(22) Filed: Mar. 18, 2016

(65) Prior Publication Data

US 2017/0268346 A1  Sep. 21, 2017

(51) Int. Cl.
*F01D 5/18* (2006.01)
*F01D 9/02* (2006.01)
*F23R 3/00* (2006.01)
*F01D 5/28* (2006.01)

(52) U.S. Cl.
CPC ............. *F01D 5/186* (2013.01); *F01D 5/288* (2013.01); *F01D 9/02* (2013.01); *F23R 3/002* (2013.01); *F05D 2220/30* (2013.01); *F05D 2230/12* (2013.01); *F05D 2230/13* (2013.01); *F05D 2230/21* (2013.01); *F05D 2230/30* (2013.01); *F05D 2230/90* (2013.01); *F05D 2240/35* (2013.01); *F05D 2250/141* (2013.01); *F05D 2250/75* (2013.01); *F05D 2260/202* (2013.01); *F05D 2300/6033* (2013.01); *F23R 2900/03042* (2013.01)

(58) Field of Classification Search
None
See application file for complete search history.

(56) References Cited

U.S. PATENT DOCUMENTS

| 4,992,025 | A  | 2/1991  | Stroud et al. |
| 6,050,777 | A  | 4/2000  | Tabbita et al. |
| 6,171,711 | B1 | 1/2001  | Draghi et al. |
| 6,667,076 | B2 | 12/2003 | Fried et al. |
| 6,744,010 | B1 | 6/2004  | Pepe et al. |
| 6,881,439 | B2 | 4/2005  | Graham et al. |
| 6,908,657 | B2 | 6/2005  | Farmer et al. |
| 7,216,485 | B2 | 5/2007  | Caldwell et al. |
| 8,257,809 | B2 | 9/2012  | Morrison et al. |
| 2003/0152460 | A1 | 8/2003 | Haselbach |
| 2005/0220618 | A1 | 10/2005 | Zhang et al. |

(Continued)

FOREIGN PATENT DOCUMENTS

| CA | 2282010 A1    | 3/2000  |
| CN | 102434287 A   | 5/2012  |
| EP | 2 937 513 A2  | 10/2015 |

OTHER PUBLICATIONS

Extended European Search Report and Opinion issued in connection with corresponding EP Application No. 17161186.6 dated Aug. 9, 2017.

(Continued)

*Primary Examiner* — Shamim Ahmed
*Assistant Examiner* — Bradford M Gates
(74) *Attorney, Agent, or Firm* — McGarry Bair PC

(57) ABSTRACT

An apparatus and method relating to a film hole of a component of a turbine engine comprising including forming the hole in the component and applying a coating to the component such that the coating fills in portions of the film hole.

24 Claims, 4 Drawing Sheets

(56) References Cited

U.S. PATENT DOCUMENTS

| | | |
|---|---|---|
| 2012/0088064 A1 | 4/2012 | Bolz et al. |
| 2014/0161585 A1 | 6/2014 | Arness et al. |
| 2016/0177733 A1 | 6/2016 | Lewis et al. |
| 2017/0152749 A1* | 6/2017 | Bunker .................. F01D 5/186 |

OTHER PUBLICATIONS

Machine Translation and First Office Action and Search issued in connection with corresponding CN Application No. 201710160127.3 dated Aug. 31, 2018.

\* cited by examiner

COMPONENT FOR A TURBINE ENGINE WITH A FILM HOLE

BACKGROUND OF THE INVENTION

Turbine engines, and particularly gas or combustion turbine engines, are rotary engines that extract energy from a flow of combusted gases passing through the engine onto a multitude of rotating turbine blades.

Engine efficiency increases with temperature of combustion gases. However, the combustion gases heat the various components along their flow path, which in turn requires cooling thereof to achieve a long engine lifetime. Typically, the hot gas path components are cooled by bleeding air from the compressor. This cooling process reduces engine efficiency, as the bled air is not used in the combustion process.

Turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary turbine engine components, thin metal walls of high strength superalloy metals are typically used for enhanced durability while minimizing the need for cooling thereof. Various cooling circuits and features are tailored for these individual components in their corresponding environments in the engine. In addition, all of these components typically include common rows of film cooling holes.

A typical film cooling hole is a cylindrical bore inclined at a shallow angle through the heated wall for discharging a film of cooling air along the external surface of the wall to provide thermal insulation against the flow from hot combustion gases during operation. The film is discharged at a shallow angle over the wall outer surface to minimize the likelihood of undesirable blow-off, which would lead to flow separation and a loss of the film cooling effectiveness.

A coating, such as a thermal barrier coating can be placed on portions of the film cooling hole to prevent thermal damage due to high temperatures.

BRIEF DESCRIPTION OF THE INVENTION

In one aspect, embodiments relate to a method of making a film hole of a predetermined inner dimension in a component of a turbine engine comprising: forming a hole in the component with the hole having an layup portion providing the hole with an inner dimension greater than the predetermined inner dimension, applying a coating to the component such that the coating fills in the layup portion leaving the hole with a dimension equivalent to the predetermined inner dimension.

In another aspect, embodiments relate to an engine component for a turbine engine, which generates a hot combustion gas flow, and provides a cooling fluid flow, comprising: a wall separating the hot combustion gas flow from the cooling fluid flow and having a hot surface along with the hot combustion gas flows in a hot flow path and a cooled surface facing the cooling fluid flow, and at least one film hole comprising a predetermined inner dimension portion and a layup portion adjacent the predetermined inner dimension portion, and a coating filling the layup portion.

DESCRIPTION OF EMBODIMENTS OF THE INVENTION

Figure 1:
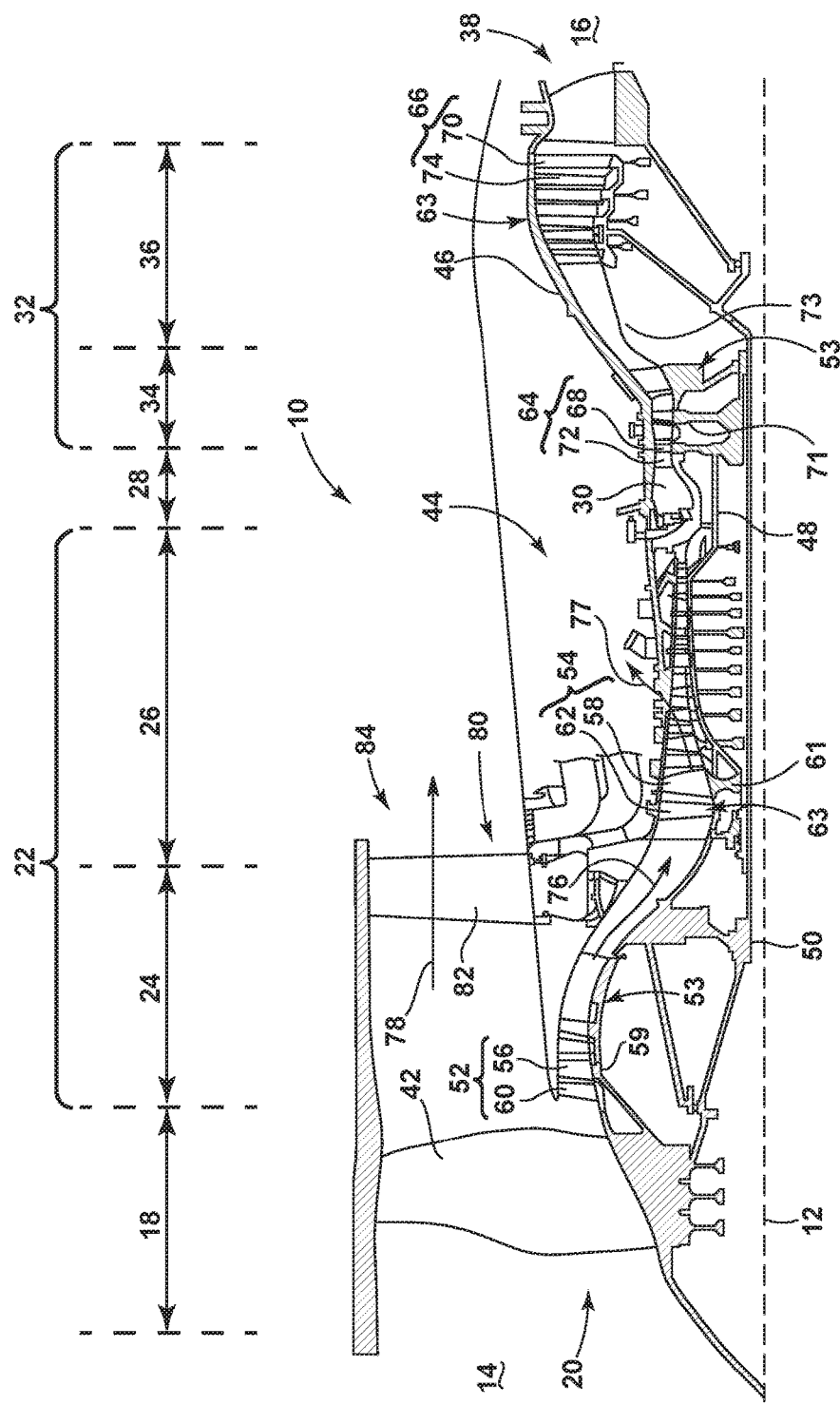
FIG. 1 is a schematic cross-sectional diagram of a turbine engine for an aircraft.

The described embodiments of the present invention are directed to the formation of a hole such as a film hole in an engine component such as an airfoil. For purposes of illustration, the present invention will be described with respect to the turbine for an aircraft turbine engine. It will be understood, however, that the invention is not so limited and may have general applicability within an engine, including compressors, as well as in non-aircraft applications, such as other mobile applications and non-mobile industrial, commercial, and residential applications.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine vanes 72, 74 can be provided in a ring and can extend radially outwardly relative to the centerline 12, while the corresponding rotating blades 68, 70 are positioned downstream of and adjacent to the static turbine vanes 72, 74 and can also extend radially outwardly relative to the centerline 12, from a blade platform to a blade tip. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 53. The stationary portions of the engine 10 including portions mounted to the core casing 46 are also referred to individually or collectively as a stator 63.

In operation, the airflow exiting the fan section 18 is split such that a portion of the airflow is channeled into the LP compressor 24, which then supplies pressurized ambient air 76 to the HP compressor 26, which further pressurizes the ambient air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally the combustor 30 and components downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26. This fluid can be bleed air 77 which can include air drawn from the LP or HP compressors 24, 26 that bypasses the combustor 30 as cooling sources for the turbine section 32. This is a common engine configuration, not meant to be limiting.

Figure 2:
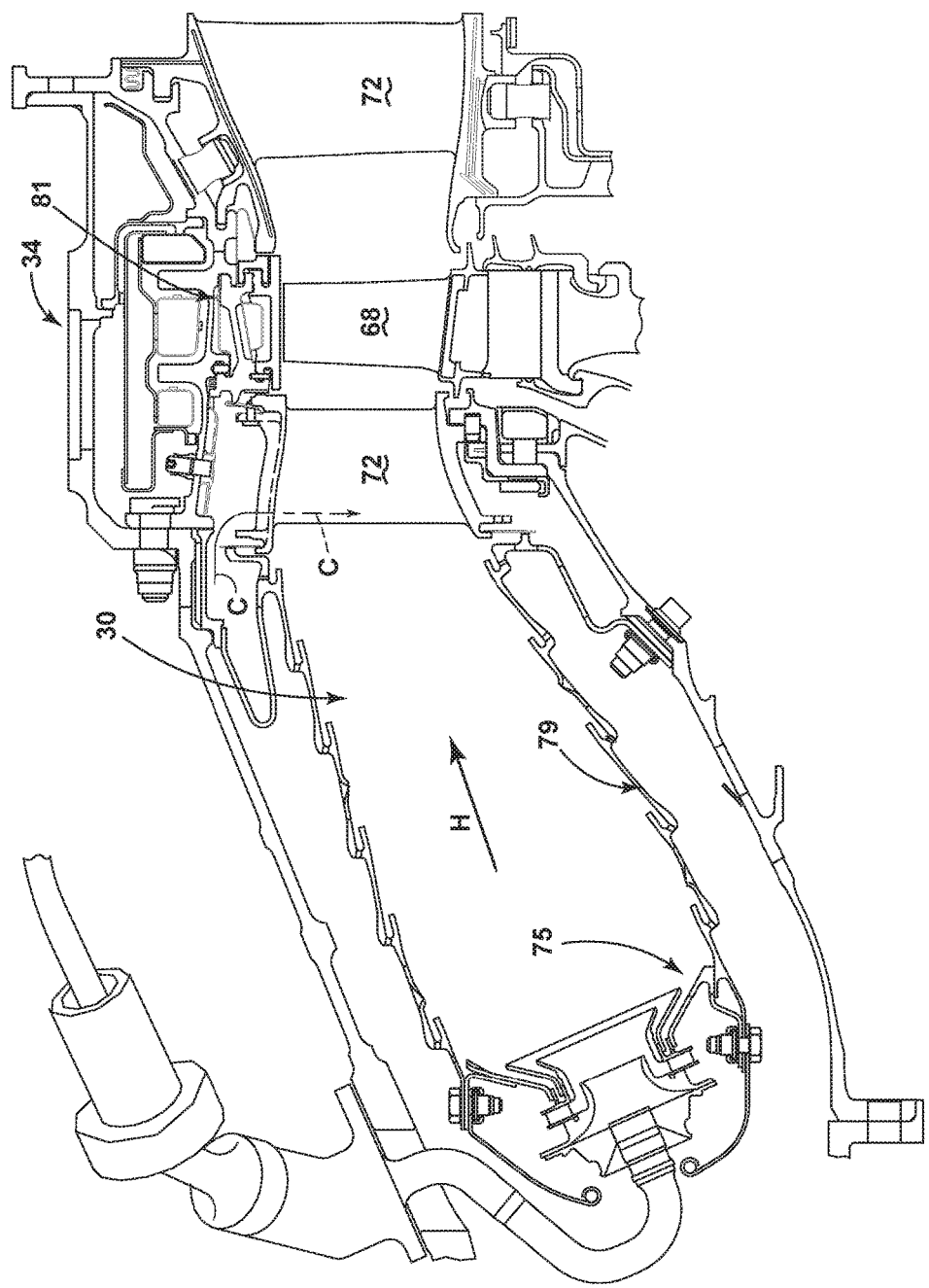
FIG. 2 is a side section view of a combustor and a high pressure turbine of the engine from FIG. 1.

FIG. 2 is a side section view of the combustor 30 and HP turbine 34 of the engine 10 from FIG. 1. The combustor 30 includes a deflector 75 and a combustor liner 79. Adjacent to the turbine blade 68 of the turbine 34 in the axial direction are sets of radially-spaced, static turbine vanes 72, with adjacent vanes 72 forming nozzles therebetween. The nozzles turn combustion gas to better flow into the rotating blades so that the maximum energy may be extracted by the turbine 34. A cooling fluid flow C passes through the vanes 72 to cool the vanes 72 as a hot combustion gas flow H passes along the exterior of the vanes 72. A shroud assembly 81 is adjacent to the rotating blade 68 to minimize flow loss in the turbine 34. Similar shroud assemblies can also be associated with the LP turbine 36, the LP compressor 24, or the HP compressor 26.

One or more of the engine components of the engine 10 includes a film-cooled substrate in which a film cooling hole, or film hole, of an embodiment disclosed further herein may be provided. Some non-limiting examples of the engine component having a film-cooled substrate can include the blades 68, 70, vanes or nozzles 72, 74, combustor deflector 75, combustor liner 79, or shroud assembly 81, described in FIGS. 1-2. Other non-limiting examples where film cooling is used include turbine transition ducts and exhaust nozzles.

Figure 3:
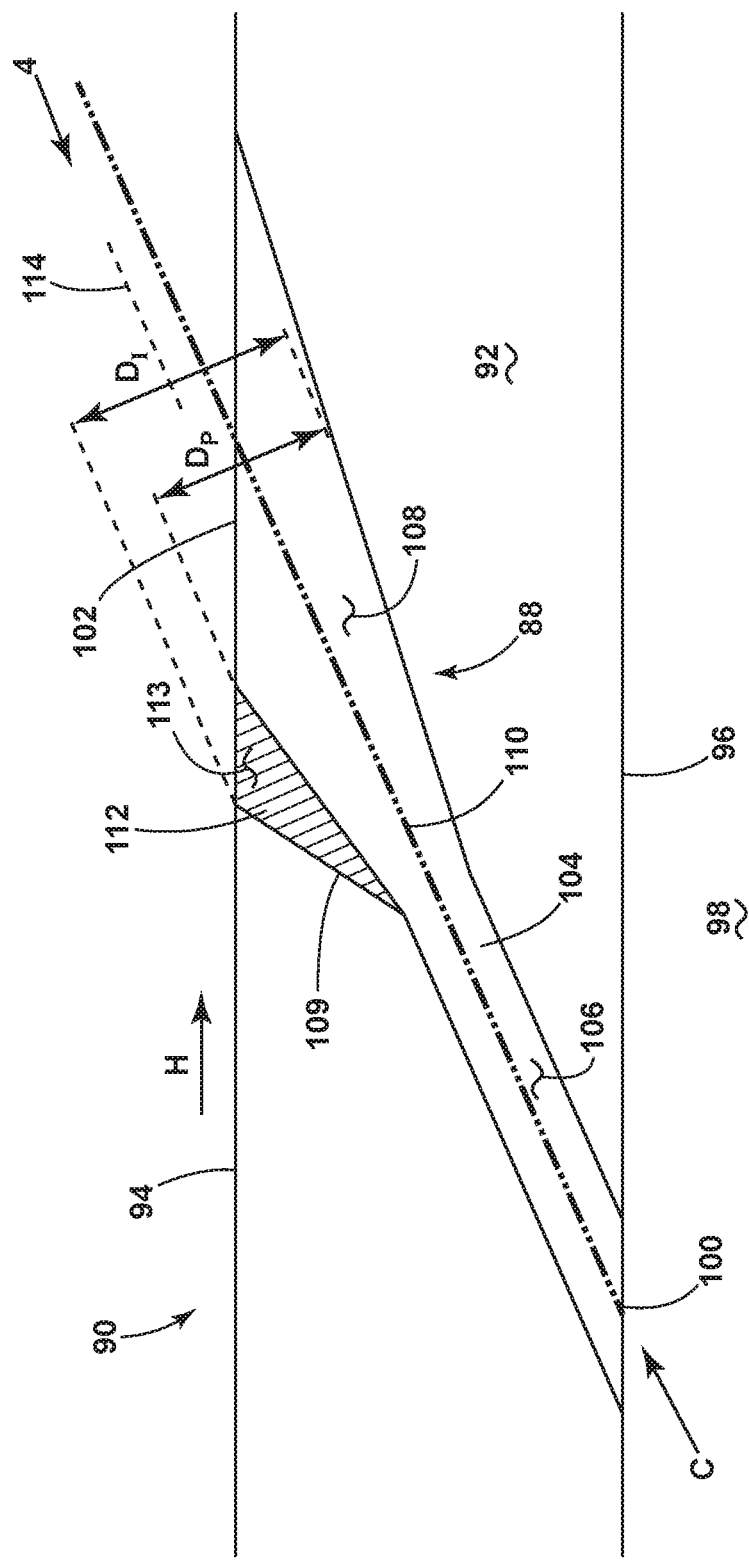
FIG. 3 is a sectional view through a film hole of an engine component of the engine from FIG. 1.

FIG. 3 is a schematic, sectional view of a hole 88, illustrated as a film hole, located in the turbine engine 10. In an exemplary embodiment the hole 88 is located in an engine component 90, such as a leading edge for an airfoil, comprising a substrate 92 separating a hot combustion gas flow H from a cooling fluid flow C. As discussed above with respect to FIGS. 1 and 2, in the context of a turbine engine, the cooling air can be ambient air supplied by the fan 20 which bypasses the engine core 44, air from the LP compressor 24, or air from the HP compressor 26.

The engine component 90 includes a substrate 92 having a hot surface 94 facing the hot combustion gas flow H and a cool surface 96 facing the cooling fluid C. The substrate 92 may form a wall of the engine component 90 that can be an exterior or interior wall of the engine component 90. The first engine component 90 can define at least one interior cavity 98 comprising the cool surface 96. The hot surface 94 may be an exterior surface of the engine component 90. In the case of a turbine engine, the hot surface 94 may be exposed to gases having temperatures in the range of 1000°

C. to 2000° C. Suitable materials for the substrate 92 include, but are not limited to, steel, refractory metals such as titanium, or superalloys based on nickel, cobalt, or iron, and ceramic matrix composites. The superalloys can include those in equi-axed, directionally solidified, and single crystal structures.

The engine component 90 further includes one or more film hole(s) 88 extending through the substrate 92 that provide fluid communication between the interior cavity 98 and the hot surface 94 of the engine component 90. During operation, the cooling fluid flow C is supplied to the interior cavity 98 and out of the hole 88 to create a thin layer or film of cool air on the hot surface 94, protecting it from the hot combustion gas flow H. While only one hole 88 is shown in FIG. 3, it is understood that the engine component 90 may be provided with multiple film holes 88, which be arranged in any desired configuration on the engine component 90.

It is noted that, in any of the embodiments discussed herein, although the substrate 92 is shown as being generally planar, it is understood that that the substrate 92 may be curved for many engine components. However, the curvature of the substrate 92 may be slight in comparison to the size of the hole 88, and so for the purposes of discussion and illustration, the substrate 92 is shown as planar. Whether the substrate 92 is planar or curved local to the hole 88, the hot and cool surfaces 94, 96 may be parallel to each other as shown herein, or may lie in non-parallel planes.

The hole 88 can have an inlet 100 provided on the cool surface 96 of the substrate 92, an outlet region comprising an outlet 102 provided on the hot surface 94, and a film hole passage 104 connecting the inlet 100 and the outlet 102. The film hole passage 104 can include a metering section 106 having a circular cross section for metering of the mass flow rate of the cooling fluid flow C, and a diffusing section 108 in which the cooling fluid C is expanded to form a lower momentum cooling film on the hot surface 94.

The diffusing section 108 is downstream of the metering section 106 with respect to the direction of cooling fluid flow C through the film hole passage 104. The diffusing section 108 may be in serial flow communication with the metering section 106. The metering section 106 can be provided at or near the inlet 100, while the diffusing section 108 can be defined at or near the outlet 102. In most implementations, the diffusing section 108 defines the outlet 102.

The cooling fluid flow C through the film hole passage 104 is along the longitudinal axis of the film hole passage 104, also referred to herein as the centerline 110, which passes through the geometric center of the cross-sectional area of the metering section 106. The hole 88 can be inclined in a downstream direction of cooling fluid flow C through the film hole passage 104 such that the centerline 110 is non-orthogonal to the hot and cool surfaces 94, 96. Alternatively, the hole 88 may have a centerline 110 that is orthogonal to one or both of the hot and cool surfaces 94, 96 in the localized area of the substrate 92 through which the centerline 110 passes. In other embodiments, the centerline 110 of the hole 88 may not be oriented in the direction of the hot combustion gas flow H, such that the vector of the cooling fluid flow C differs from that of the hot combustion gas flow H. For example, a film hole that has a compound angle defines a cooling flow vector that differs from the hot combustion gas flow vector not only in cross sectional view, but also in the top-down view looking at the hot surface 94.

The diffusing section 108 can comprise a conical section 109. A layup portion 112 extends along the conical section 109 closest to the hot surface 94 and is defined by an inner dimension $D_I$ having a centerline 114 offset from the centerline 110. In this way, when viewed from the outlet 102, the inner dimension $D_I$ encompasses an area 113 asymmetrical to the centerline 110. While illustrated closest to the hot surface 94, the layup portion 112 can be at any orientation relative to the hot surface, for example but not limited to the opposite side or encompassing the entire conical section 109.

Figure 4:
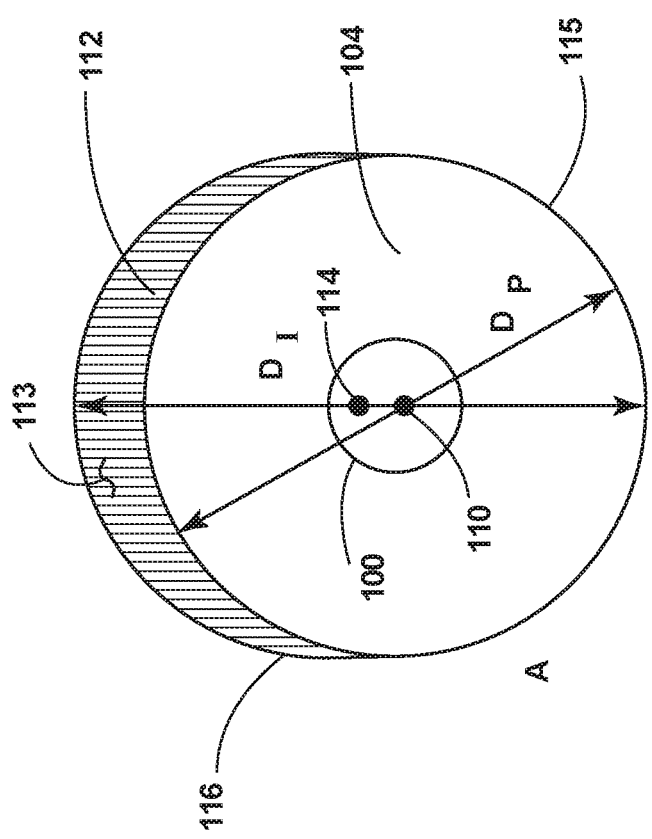
FIG. 4 is top view of the outlet of the film hole of FIG. 3.

As is illustrated in FIG. 4 a predetermined inner dimension $D_P$ and the layup portion 112 together collectively define the asymmetrical area 113. The predetermined inner dimension $D_P$ is symmetrical around the centerline 110 to form, for example, a circle 115. The layup portion 112 can be provided on a portion of the hole so as to form a crescent portion 116 adjacent the circle. While a circle is shown as an example cross-sectional profile, it will be understood by those skilled in the art that other cross-sectional profiles can be employed without departing from the scope of this invention.

In addition, while the measurement of various portions of the hole 88 is described in terms of a dimension, the size of the hole 88, and various portions thereof, can be generalized as having a dimension, and the expression of that dimension as a diameter herein shall not be construed as limiting the scope of this invention. The hole can have a circular or non-circular cross-section. In the case of a circular cross section, the dimension is the inner diameter of the circle. However, for non-circular cross sections, the dimension may be characterized as an effective diameter or dimension (measured or calculated), which need not be the diameter is a technical sense, even if the dimension is referred to as a diameter. For example, in the case of an elliptical cross section, the dimension can be the major/minor axis or some other effective dimension, any of which can be referred to as a diameter. The layup portion 112 can vary in depth and extent of arc section comprising the crescent portion 116 depending on factors such as coating thickness, coating application methods, hole size, etc. Likewise, the arc section need not be a circular arc section.

A method of making the film hole 88 includes forming the hole 88 in the engine component 90 by plunging an electro-discharge tool to form the metering section through the wall thickness, then plunging a second tool or orientation to form the layup portion having the layup portion 112 that provides the hole 88 with the inner dimension $D_I$ which is greater than the predetermined inner dimension $D_P$. The layup portion 112 forming an area where a coating is applied to the component 90 such that the coating fills in the layup portion leaving the hole with a diameter equivalent to the predetermined inner dimension $D_P$. The coating can be applied in one or multiple layers depending on the method of application. The coating can be a thermal barrier coating (TBC) which includes the superalloy substrate already described along with a metallic bond coat, thermally grown oxide, and one or more ceramic topcoats.

In the case of a CMC substrate, an environmental barrier coating (EBC) is a multi-layer stack-up of coatings, for example but not limited to an air plasma TBC and mullite. Other methods for forming the film hole include but are not limited to machining via electrode, 3-D printing, SLA, machining via a laser, or by casting in.

Current methods for applying a thermal barrier coating impact the laydown portion of the conical region which is the region opposite of the layup portion described herein. Placing thermal barrier coating on the layup portion optimizes aerodynamic flow in the film hole by maintaining the laydown portion geometry as intended. Testing done with the final aerodynamic shape using the method described quantified the benefits discussed herein.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of making a film hole of a predetermined inner dimension in a component of a turbine engine that generates a hot combustion gas flow, and provides a cooling fluid flow, where a wall separates the hot combustion gas flow from the cooling fluid flow and defines a hot surface along which the hot combustion gas flows in a hot flow path and a cooled surface facing the cooling fluid flow, the method comprising:
    forming a hole in the component with the hole having a layup portion facing away from the hot surface and providing the hole with an inner dimension greater than the predetermined inner dimension;
    applying a coating to the component such that the coating fills in the layup portion leaving the hole with a dimension equivalent to the predetermined inner dimension.

2. The method of claim 1 wherein the layup portion is provided on a portion of the hole.

3. The method of claim 1 wherein the predetermined inner dimension defines a circle.

4. The method of claim 3 wherein the layup portion comprises a crescent portion adjacent the circle.

5. The method of claim 3 wherein the layup portion comprises a circle having a larger diameter than the predetermined inner dimension.

6. The method of claim 1 wherein the hole comprises a conical section and the layup portion extends along the conical section.

7. The method of claim 6 wherein the hole comprises a metering section upstream of the conical section.

8. The method of claim 7 wherein the metering section comprises a circular cross section.

9. The method of claim 1 wherein the coating comprises a substrate, bond coat, and one or more ceramic-based topcoats.

10. The method of claim 1 wherein the film hole is made by machining via electro-discharge machining, 3-D printing, machining via a laser, or by casting in.

11. The method of claim 1 wherein the inner dimension is at least one of a diameter, major axis or minor axis.

12. The method of claim 1 wherein the hole has at least one of a circular or non-circular cross section.

13. An engine component for a turbine engine, which generates a hot combustion gas flow, and provides a cooling fluid flow, comprising:
    a wall separating the hot combustion gas flow from the cooling fluid flow and having a hot surface along which the hot combustion gas flows in a hot flow path and a cooled surface facing the cooling fluid flow;
    at least one film hole comprising a predetermined inner dimension portion extending between a layup portion close to the hot surface and a laydown portion opposite the layup portion and close to the cooled surface, the layup portion located adjacent the predetermined inner dimension portion; and
    a coating filling the layup portion.

14. The engine component of claim 13 wherein the layup portion is provided on only a portion of the predetermined inner dimension portion.

15. The engine component of claim 13 wherein the predetermined inner dimension portion is symmetrical about its centerline.

16. The engine component of claim 15 wherein the predetermined inner dimension portion is a circle.

17. The engine component of claim 15 wherein the layup portion and predetermined inner dimension portion collectively define an area asymmetrical to the centerline of the predetermined inner dimension portion.

18. The engine component of claim 13 wherein the predetermined inner dimension portion is a circle.

19. The engine component of claim 18 wherein the layup portion is a crescent.

20. The engine component of claim 13 wherein the layup portion comprises a circle having a larger diameter than the predetermined inner dimension.

21. The engine component of claim 13 wherein the film hole comprises a conical section and the layup portion extends along the conical section.

22. The engine component of claim 21 wherein the film hole comprises a metering section upstream of the conical section.

23. The engine component of claim 22 wherein the metering section comprises a circular cross section.

24. The engine component of claim 23 wherein the coating comprises multiple layers.

* * * * *